US005742669A

United States Patent [19]

Lim

[11] Patent Number: 5,742,669
[45] Date of Patent: Apr. 21, 1998

[54] TELEPHONE FOR STORING PARTICULARS OF OUTGOING CALLS AND/OR SPECIAL SERVICE CODES

[76] Inventor: Boon-Chen Lim, Flat A, 4th Floor, Flat A & B, 3rd Floor Shun Yee Industrial Bldg, 30-32 Lee Chung St., Chaiwan, Hong Kong

[21] Appl. No.: 162,910

[22] Filed: Dec. 8, 1993

[51] Int. Cl.⁶ .................... H04M 15/00; H04M 1/66
[52] U.S. Cl. .............. 379/130; 379/136; 379/199; 379/200
[58] Field of Search .................. 379/111, 112–114, 379/130, 131, 133, 136, 140, 188, 189, 199, 200, 354, 355, 201, 96, 207, 216, 210–212, 110, 396

[56] References Cited

U.S. PATENT DOCUMENTS

| | | |
|---|---|---|
| 4,013,839 | 3/1977 | Bell . |
| 4,482,787 | 11/1984 | Sagara et al. .................... 179/90 |
| 4,578,540 | 3/1986 | Borg ................................ 379/200 |
| 4,585,904 | 4/1986 | Mincone et al. ................ 379/200 |
| 4,612,419 | 9/1986 | Smith ............................... 379/200 |
| 4,656,657 | 4/1987 | Hunsicker ....................... 379/131 |
| 4,751,728 | 6/1988 | Treat ............................... 379/114 |
| 4,813,065 | 3/1989 | Segala ............................ 379/130 |
| 4,833,707 | 5/1989 | Serret, Jr. ....................... 379/200 |
| 4,924,496 | 5/1990 | Figa et al. ...................... 379/199 |
| 4,982,423 | 1/1991 | Muroi ............................. 379/355 |
| 5,034,976 | 7/1991 | Sato ................................ 379/140 |
| 5,054,059 | 10/1991 | Stern .............................. 379/131 |
| 5,067,150 | 11/1991 | Satomi et al. .................. 379/354 |
| 5,134,653 | 7/1992 | Satomi ........................... 379/354 |
| 5,159,698 | 10/1992 | Harrington ..................... 379/112 |
| 5,189,696 | 2/1993 | Yoshida . |
| 5,200,995 | 4/1993 | Gaukel ........................... 379/200 |
| 5,283,818 | 2/1994 | Klausner ......................... 379/96 |
| 5,329,578 | 7/1994 | Brennan ......................... 379/142 |
| 5,373,551 | 12/1994 | Baals et al. .................... 379/355 |
| 5,377,261 | 12/1994 | Baals et al. .................... 379/110 |
| 5,381,461 | 1/1995 | Baals et al. .................... 379/355 |

FOREIGN PATENT DOCUMENTS 2 134 749 8/1984 United Kingdom .
2204463 11/1988 United Kingdom .

*Primary Examiner*—Curtis Kuntz
*Assistant Examiner*—Vijay Shankar
*Attorney, Agent, or Firm*—Burns, Doane, Swecker & Mathis, L.L.P.

[57] ABSTRACT

A feature telephone phone set has a call length recording and call sorting system which can record a plurality of called numbers, date, time, length and so on of each telephone call, and store records into two separate memory areas according to whether the call is a local call or a toll call. Recorded contents can be retrieved and shown on an LCD display. When the memory is full, older records are deleted automatically or manually. Because toll calls are more important than local calls, when the memory is full different criteria of deletion are obeyed when automatic deletion is performed. Special service codes and their descriptions are also provided, and each code can be retrieved by a common key and dialled by another common key.

24 Claims, 6 Drawing Sheets

| OTMDK (1) | LINKER |
|---|---|
| OTMDK (2) | LINKER |
| ⋮ | ⋮ |
| OTMDK (i) | LINKER |
| ⋮ | ⋮ |
| OTMDK (n) | LINKER |

MAPPING TABLE

*FIG. 7a*

SSC SEQUENCE NUMBER

| | | |
|---|---|---|
| 1 | SSC (1) | ASSIGNMENT |
| 2 | SSC (2) | ASSIGNMENT |
| | ⋮ | ⋮ |
| j | SSC (j) | ASSIGNMENT |
| | ⋮ | ⋮ |
| m | SSC (m) | ASSIGNMENT |

SSC BANK STRUCTURE

TELEPHONE FOR STORING PARTICULARS OF OUTGOING CALLS AND/OR SPECIAL SERVICE CODES

FIELD OF THE INVENTION

The present invention relates to telephones which store particulars of one or more outgoing calls and/or special service codes. One example is a telephone which stores detailed particulars of all calls for billing purposes. Another example is a telephone which stores the last dialed number for ease of redialing.

PRIOR ART

Various different types of apparatus for recording and storing particulars of outgoing calls for billing purposes are already available on the market.

One type for use in the home or a small business can be connected to a telephone and includes a mechanical printer for printing out details of telephone calls.

A second type for use in larger businesses is built into a PABX or other relatively complex telephone circuit.

Telephones including a function for storing the last-dialed number are already available on the market. This function is very convenient, but is nevertheless limited only to redialing the last outgoing call.

Telephones including a function for storing frequently used numbers, and for programming the telephone so that one key on the telephone corresponds to each frequently dialed number, are also available on the market. Again, this function is very convenient in many instances, but is nevertheless limited only to dialling a very small set of telephone numbers.

SUMMARY OF THE INVENTION

According to a first aspect of the present invention, there is provided a telephone which includes a recording system for recording particulars of outgoing telephone calls, a memory for storing the recorded particulars of a certain number of the outgoing telephone calls, these particulars being useful in assessing the cost of the telephone calls, a dynamic visual display for displaying the particulars, and a control system for optimizing the use of the memory so that particulars of more important calls are stored in preference to particulars of less important calls in the event of insufficient memory capability.

The above described arrangement, involving use of limited memory and a simple visual display without the need for a printer, is inexpensive.

It is therefore possible to provide a telephone which stores information for billing purposes in a very simple and inexpensive manner, in particular more simply and inexpensively than existing telephones.

In accordance with a preferred feature the telephone includes an electronic locking system for certain calls, the electronic locking system being capable of recognizing multiple access codes, and the telephone being operable to record and store the access code used for each outgoing call.

According to a second aspect of the present invention, there is provided a telephone or telephone add-on device including a memory for storing a data bank of service codes (telephone numbers), the data bank being sufficiently large to store the service codes and descriptions of the associated services provided by, for example, the telephone company, and a dynamic visual display means for displaying selected data from the data bank. In accordance with a preferred arrangement, the service codes and the descriptions of the codes can be retrieved and shown on the display means by a single common key and, while any one of the codes and/or the descriptions is retrieved and shown on the display means, the displayed code can be dialled by pressing a common key. Preferably, if the dialled code has an associated code for terminating/cancelling the service, then, after dialling of the service code, the termination/cancellation code can also be retrieved and dialled by a common key. Preferably, by pressing a common key, the associated code of the previously dialled code can be automatically retrieved and dialled.

It is therefore possible to provide a telephone which stores particulars of a small data bank of telephone numbers in a simple and inexpensive manner, in particular a data bank of the special services provided by the telephone company, these special services nowadays exceeding in number the number of keys on a telephone keyboard.

BRIEF DESCRIPTION OF THE DRAWINGS

The invention may be better understood from the following detailed description of preferred embodiments, when read with reference to the drawings in which:

FIGS. 7a and 7b illustrate two tables required for processing special service codes.

DETAILED DESCRIPTION OF PREFERRED EMBODIMENTS

The preferred embodiments sort outgoing calls into different types according to whether they are local calls or toll calls and log calls in two files for later review. Recorded data include date, time, called number and duration of each call. In order to keep as much important information on file as possible when memory capacity is limited, both automatic and manual means of memory management are provided.

HARDWARE

Figure 1:
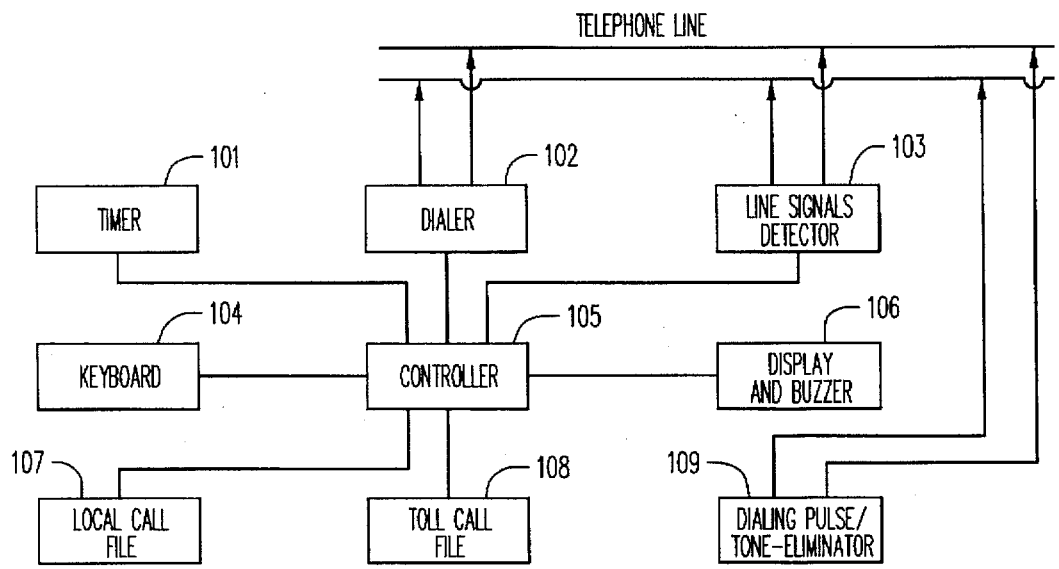
FIG. 1 is a block diagram of a preferred embodiment of a feature phone in accordance with the invention.

As illustrated in FIG. 1, the system consists of nine main parts. The keyboard 104 is used to dial numbers and give commands, such as retrieving stored contents or deleting some record etc. Dialer 102 is for dialing out phone numbers to the telephone line. Local call file 107 and toll call file 108 are the separate areas in the system memory, in which sorted records about outgoing calls are stored. Timer 101 gives out regular timer signals to run a call length timer and a clock. Display and buzzer 106 works as a calendar and an alarm clock when the phone is not in use. When the phone is in use, the display shows dialed number, data, time etc. The display and buzzer also gives out system information such as the "MEMORY FULL" sign. When a call is being made, the display and buzzer work as an alarm timer. Line signals detector 103 and dialing pulse/tone eliminator 109 are two optional devices. Line signals detector 103 detects signals on the telephone line such as a ringing back tone, dialing made by any telephone extensions on the same line, on hook and off hook of the phone at the called party and so on. The results of those detections are helpful for more accurate call length measurement, which will be discussed hereafter. Dialing pulse/tone eliminator 109 eliminates the dialing pulse/tone signal when toll call lock is provided and activated, which will also be discussed hereafter. The controller 105 is a microprocessor carrying out all system functions.

Figure 2:
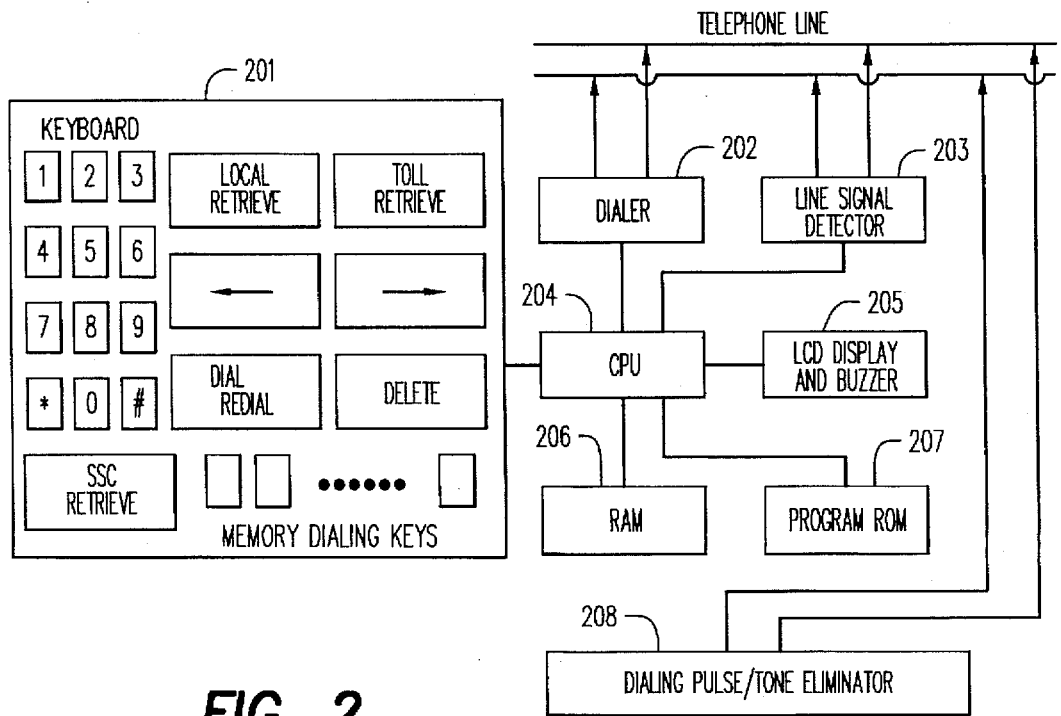
FIG. 2 is the hardware configuration of a preferred embodiment of the feature phone.

The system can be completed in a very simple configuration as shown in FIG. 2. It is composed of a keyboard 201; a liquid crystal display (LCD) and buzzer 205; a microprocessor 204, which includes the timer, LCD driver and memory address logic; a RAM 206; a program ROM 207; a dialer integrated circuit 202 and line signals detecting circuit 203; and a dialing pulse/tone eliminator 208.

SOFTWARE

Figure 3:
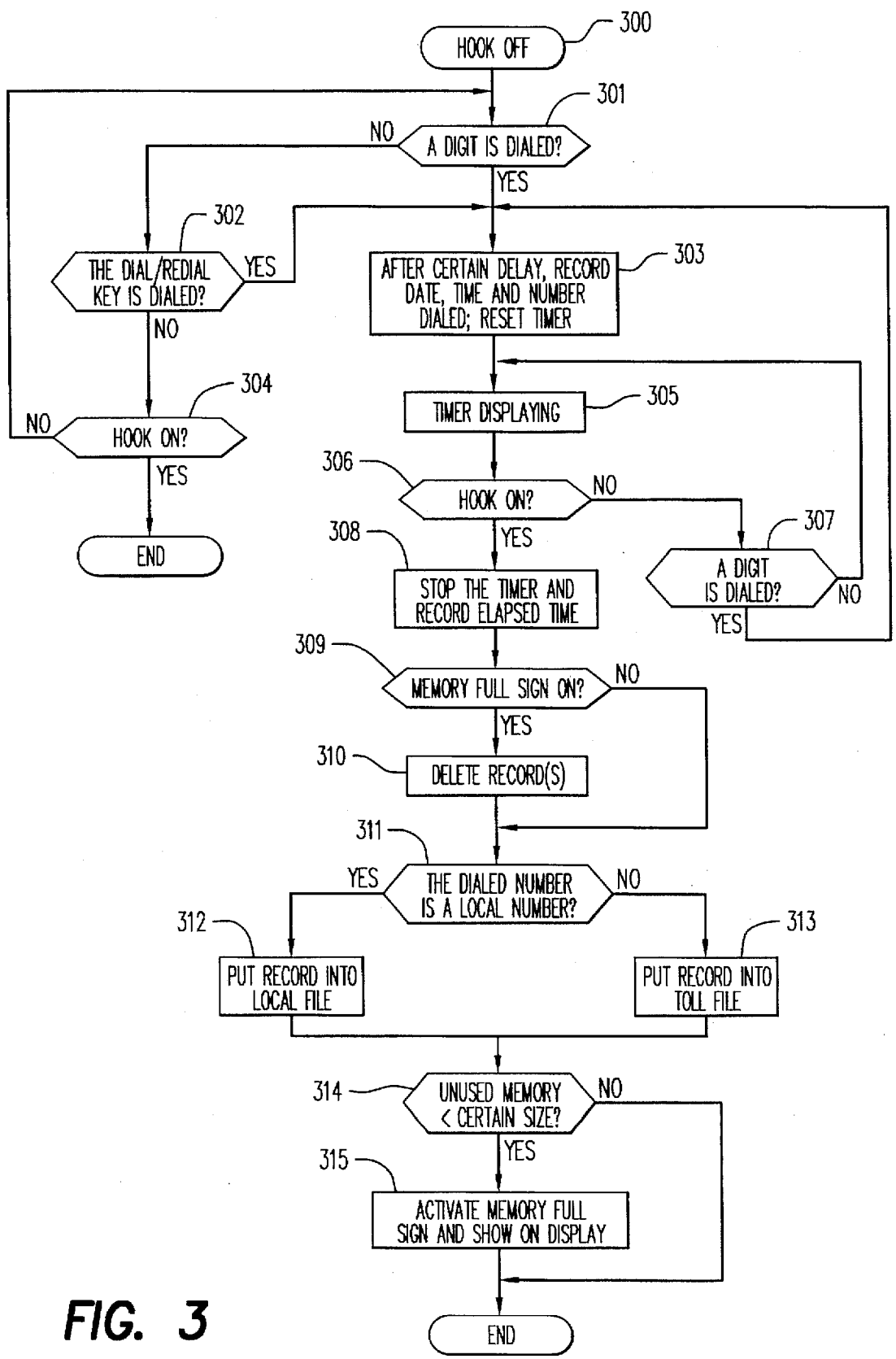
FIG. 3 is a flowchart showing the routine in accordance with which the feature phone records and stores data related to phone calls and manages the memory.
Figure 4:
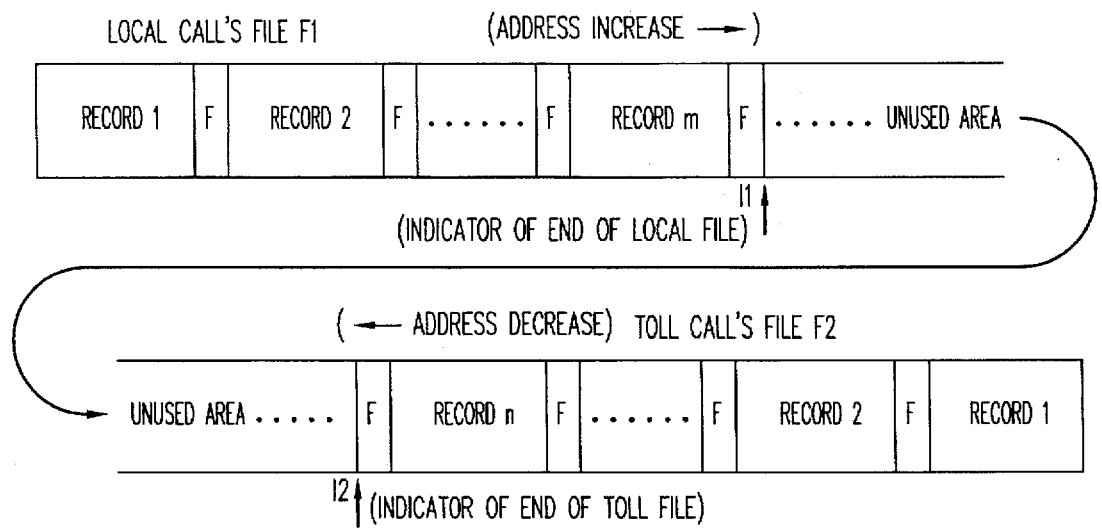
FIG. 4 illustrates the memory structure in the feature phone.

FIG. 3 to FIG. 6 illustrate the software used in the system. FIG. 3 illustrates a preferred software routine. As soon as the hook is off at block 300, the system detects the dialing of digit keys at block 301. If a digit key is dialed, the timer is started and current date, time and dialed number are recorded in block 303 after a certain pre-determined delay. Having been started, the timer is displayed on the screen at block 305. Meanwhile, if the hook is still off and one more digit key is dialed at block 307 (ie call unsuccessful) the timer is restarted after a certain delay, and the date and time are rerecorded too. The new dialed digit is added to the dialed number at block 303. If no more digit key is dialed, it is considered that the call is successful. The timer is started and shown on display at block 305 until the hook is on, which is considered the sign of ending of the call. During this time, the system can also beep at a user defined time interval. For example, it beeps one time at one minute, two times at two minutes and so on.

If, instead of using digit keys, the user dials a number by the DIAL/REDIAL key at block 302, the timer is also started at block 303 with a certain pre-determined delay after the dialing of the number. When the ending of the call is detected, the timer stops and its value, the length of call, is recorded at block 308.

Before putting recorded data into file, a testing of whether there is sufficient space in memory for the new record must be done at block 309. If there is not, some old record(s) will be deleted at block 310. Then, the call will be classified as to whether it is a local call or a toll call at block 311. This classification can be based on the length of the called number, for example numbers longer than eight digits may be regarded as toll numbers, or based on the prefix, for example numbers having the prefix of 0 or 1 may be regarded as toll numbers. After classification, the record is stored into different files at blocks 312 or 313, according to its classification.

After that, a test of whether the unused space in memory is less than the certain size, say size for two records, will be done at block 314 to decide whether a sign indicating the memory is close to full should be activated and displayed at block 315. The sign will remind the user to manually delete some record(s) he thinks need not be kept any longer. If the user does not delete any records while the memory is full, automatic deletion is done by the system at block 304. For the deleted call it is considered that no call was made and no record is kept in the file.

Additionally, based on the classification, a toll call lock can be provided. If the system is toll call locked, it will refuse any toll call unless an unlock password is recognized.

The method of detecting the beginning and ending of a call as described above is the most simple one. However, it may produce some false records in the file. For instance, in the situation that the user dials a number but no one answers the call, the system would record the call and the length of call, whereas no connection has in fact been made and no charge will be made by the telephone company. There are several other methods to perform the mission, which include:

(a) using a TIMER key to start or reset and restart the timer, ie when the line is actually through, the user presses the TIMER key once, the timer is started or reset and restarted. If the user does not press the TIMER key, the timer starts to run based on the dialing of the last digit of the called number as described in FIG. 3. Then when the call ends, the user hangs up the phone, the timer is stopped, and its value will reflect the actual time length of the call accurately;

(b) using a line signal detector that detects the ringing back tone, ie when a tinging back tone is detected, the timer is started. As each successive tinging back tone is detected (indicating that the phone is still ringing and has not been answered), the timer is restarted. When no more tinging back tones are detected the time difference between the last tinging back tone and the actual beginning of a connection can be balanced by subtracting half of the time interval between two ringing back tones from the last restarted value of the timer;

(c) using a line signal detector detecting the off hook signal at the called party, ie when the phone is off hook at the called party, the timer is started, and when the hook is on at the calling party, the timer is terminated.

Among them, the method (a) is quite simple and can provide high accuracy. Its disadvantage is needing extra operating by the user. The method (b) needs no extra operating by the user and can detect the beginning of a call quite accurately. The method (c) is the best at every performance and can record the length of a call most accurately. However, method (c) needs more hardware, so it is the most expensive method.

Because local calls are made much more frequently than toll calls and records of local calls are less important than those of toll calls, two separate fries/memory areas are established for storing records of the two types of calls. For more effective utilization of memory, files are organized in the way shown in FIG. 4. Local call records are stored at one terminal/side of the memory, while toll call records are stored at another terminal/side. The two files extend from two terminals and will meet each other at some place, depending on the amount of the two types of calls. When the two files meet, the memory is full and some deletion must be done. There are two means of deletion in the system, automatic deletion and manual deletion.

AUTOMATIC RECORD DELETION—PRIORITY SCHEME

Figure 5:
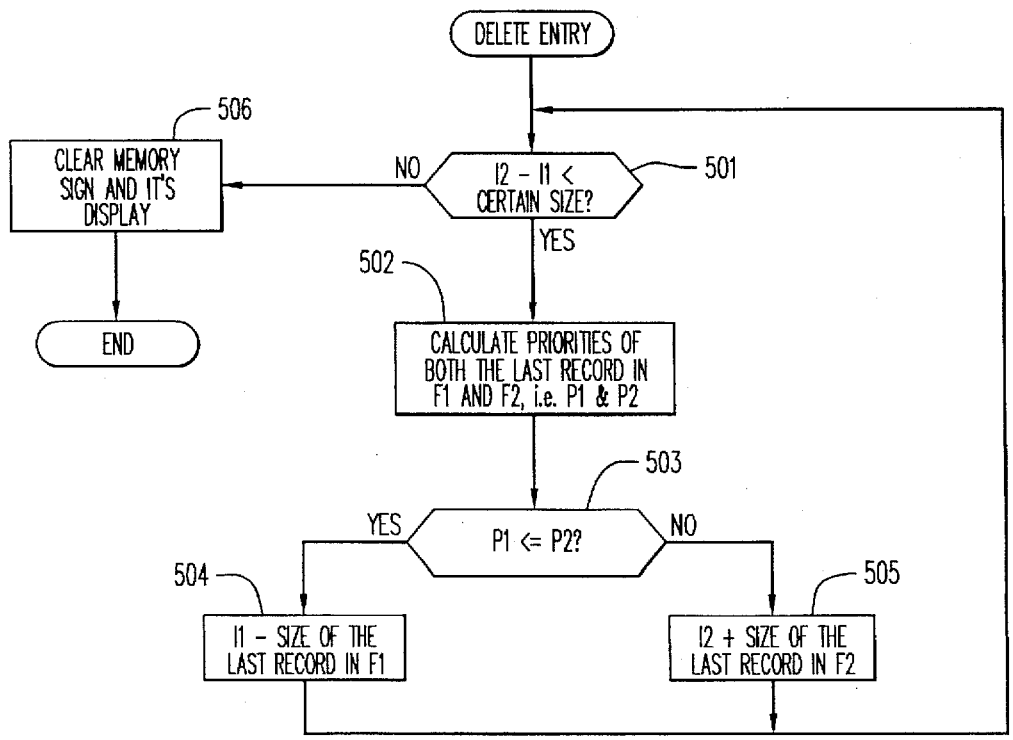
FIG. 5 is a flowchart showing a preferred method of automatic record deletion.

FIG. 5 shows the procedure of automatic record(s) deletion. If the memory is full and a new record comes before the user deletes some old records manually, automatic deletion is performed. Automatic deletion will be made at the rear end of one or other of the two files, because the last record in a file is the oldest one. In the system a priority method is used to decide from which of the two files the last record is deleted at block 502. The priority of the last record in both files is calculated by the following formulas:

Local call priority P1=(−1)×coefficient of local file×days that the record has been in the file Toll call priority P2=(−1)×coefficient of toll file×days that the record has been in the file that is the longer the record has been in file, the smaller the priority it has, and the sooner it will be deleted.

If the user want to keep toll call records for at least one month, which requirement can be put into the system by selecting from a menu, the system will assign a value of $1/30$ to the coefficient of the toll file and assign a value of 1 to the coefficient of the local file. In this case, records of less than 30 days in the toll call file will have bigger priority than records of one day old in the local call file and be reserved, unless the total size of records of toil calls in the period is bigger than the size of the entire memory. Please see the following examples.

EXAMPLE 1

Assume the last record in the local file F1 is one day old and the last record in the toll file F2 is twenty nine days old. Their priorities are calculated as follows:

P1=(−1)×1×1=−1

P2=(1)×$1/30$×29=$−29/30$>−1

So P2>P1, and the last record in local file F1 will be deleted.

EXAMPLE 2

Assume the last record in the local file F1 is one day old and the last record in the toll file F2 is thirty one days old. Their priorities are

P1=(−1)×1×1 =−1

P2=(−1)×$1/30$×31=$−31/30$<−1

This time, P1>P2 and the last record in F2 will be deleted. Therefore, this method can avoid very old records existing in the file permanently, if user does not do manual deletion.

EXAMPLE 3

Assume the user wants to reserve toll records for a very long time, say six months (ie 180 days), and the memory is not big enough to store so many records. In this situation, the toll file is assigned a coefficient of $1/180$. Assume all records in F1 have already been deleted and the last record in F2 is 140 days old. Priority for an empty file can be calculated on the basis that the last record in an empty fie can be considered as having existed in the file for zero days. So

P2=(−1)×$1/180$×0=0

P2=(−1)×$1/180$×140=$−7/9$<0

In this way, the oldest record in F2 is deleted and newer records are reserved.

After deciding which record is to be deleted, by comparing priorities of the last record of the two files at block 503, the deletion operation simply involves changing the value of the end indicator of the file with smaller priority in flowchart blocks 504 and 505. Every time, after a record is deleted, the system will check whether the vacated memory space will make the unused memory size bigger than the certain size, say the size for two records, at step 501. If not, further deletion is needed. Otherwise, the "memory full" sign should be cleared and its display should be eliminated in block 506.

RETRIEVAL AND DISPLAY OF RECORDS

Figure 6:
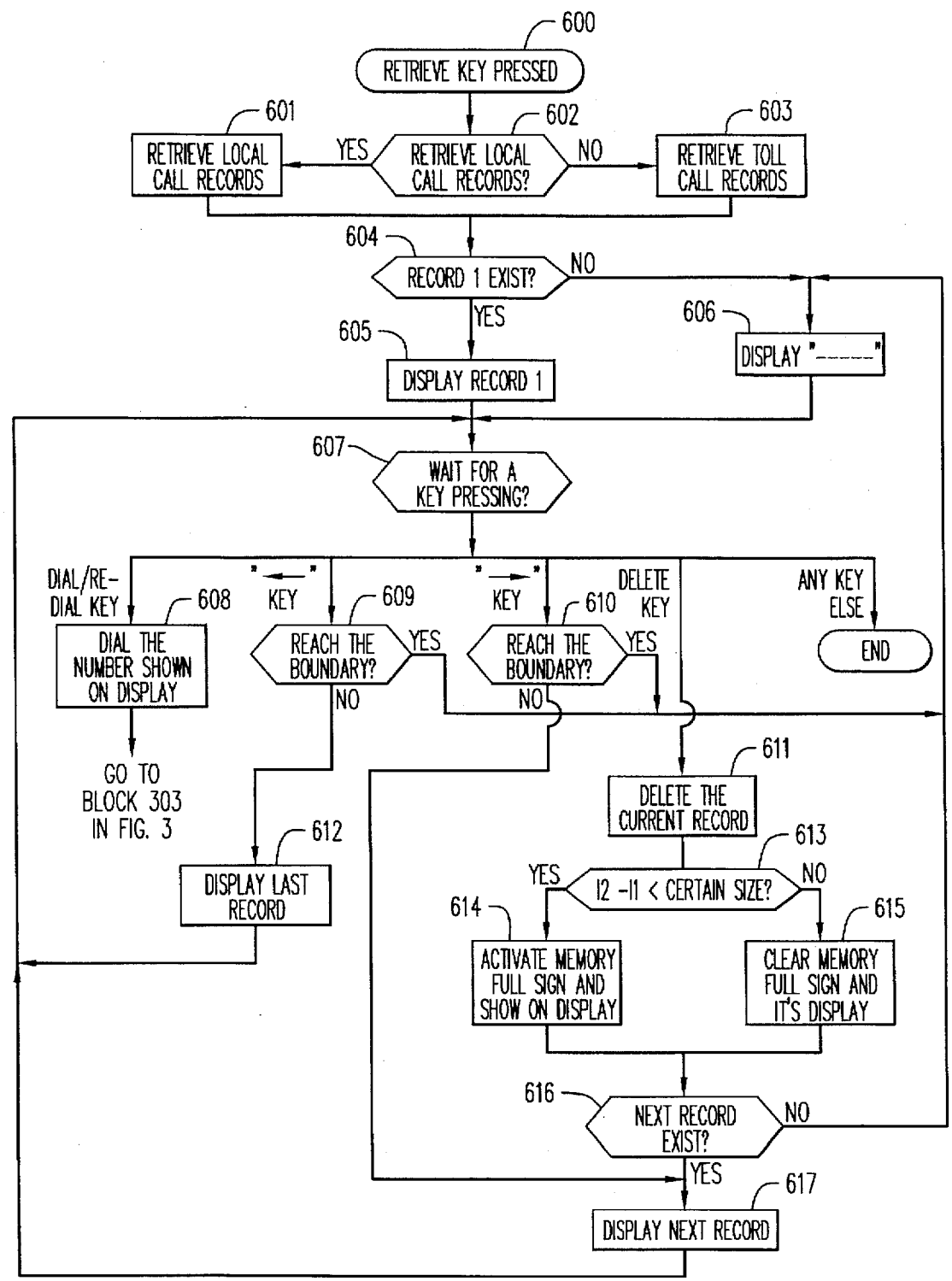
FIG. 6 is a flowchart showing a preferred retrieval method including the means of deleting records when memory is full or when the user chooses.

FIG. 6 shows the procedure for retrieving records of calls. When the RETRIEVE key is pressed at block 600, the system must decide whether the local call file or the toll call file is to be retrieved at block 602. At this stage, at least three different ways are available. The first one is using two different RETRIEVE keys. The second one is utilizing a screen menu, if the screen is big enough for a two choice menu. The third one is a variation of the second one, that is displaying "local" and "toll" on screen alternately in the interval of one second, and the user can select one of them by pressing any key when one choice is on display.

After choosing one file to review, the first record in the file is retrieved and displayed on the screen at block 605, if the file is not empty at step 604. If the file is empty, some sign such as "----" can be displayed at block 606. At step 607, the user can review the following records by pressing a "→" key successively. The successive records will be displayed successively at block 617. If the last record in the file is reached at step 610, the "-----" is displayed at block 606 to indicate the end of the file. Alternatively at step 607 the user can press the "←" key and the previous records will be retrieved and displayed at block 612 unless the first record is reached at block 609, whereupon a "-----" is displayed at block 606.

When a record is on display, the user can press DIAL/REDIAL key to dial the number shown on the display at block 608.

If the user thinks the record on display is unnecessary and need not be kept any longer, the record can be deleted by pressing a DELETE key at block 611. When a record is deleted, its space will be occupied by its successive record, and some space is vacated at the rear end of the file. If the "memory full" sign is activated before a deletion and the space newly vacated by the deletion makes the unused space between the rear ends of the two files bigger than a certain size, say size for two records, at step 613, the "memory full" sign will be cleared and its display will be eliminated at block 615. If the unused space is still less than the certain size after the deletion, the "memory full" sign will remain activated at block 614, which indicates that some more deletions are still needed to make sufficient unused space for new records.

After a record on display is deleted, its successive record takes its place on the screen at block 617. If the deleted record is the last record in the fie, ie it has no successive record, the sign "-----" will be displayed at block 606.

If any other key is pressed at step 607, the retrieval procedure is ended.

Besides using "→" and "←" keys to retrieve records in files, some more retrieval methods may be incorporated in the system, especially when the system has a big memory and several hundred records are contained in the two files. Those retrieval methods include retrieving by called numbers, by date, by time, by call length, and by sequence number etc. They can be selected by the user from the screen menu. Besides, some statistical functions can be added, such as the total calls made in one day or one month, total length of calls, total calls to a particular number etc. These statistical data can be calculated and displayed.

ELECTRONIC LOCKING—MULTIPLE CODES

Electronic locking of dialing of toll calls is available on many phones on the market at present, and the method/means of coding and decoding for locking and unlocking the dialing of a toll call by a CPU is also simple and well known, so there is no need to give a detailed description of electronic locking. The significant difference, when used in the preferred embodiments of the present invention, is that not only one code can unlock the toll call dialing, but a plurality of codes can unlock the toll call dialing and the unlock code or its assignment will also be included in each stored record of a toll call. In use, one particular code is assigned to one particular user and is not to be revealed to other users, so when the records are retrieved, the unlock code will not be displayed, only its assignment together with the other contents of each record will be be displayed. From the displayed assignment, caller of each call will apparently be known.

Furthermore, as each record of a toll call will include an unlock code or its assignment, it is easy for the CPU to sort the records into groups according to the unlock codes or their assignments grouped under the same unlock code or its assignment. Such an arrangement is advantageous and convenient for reading and checking during record retrieval.

As described previously and shown by block 203 of FIG. 2, the dialing of other phone(s) which are connected to the same line can also be detected by using the line signal detector 203. Hence the recording system can also be extended to record the particulars of calls of extension phones, and the means for locking of calls can also be provided to lock the dialing of all phones which are connected to the same phone line. In Lock mode, when a toll call dialing is detected, the controller CPU 204 can simply activate an output to control a dialing pulse/tone eliminator 208 to eliminate the dialing tone/pulse signal (simply filtering the tone or short circuiting the pulse dialing) to appear/ send out on the phone line.

SPECIAL SERVICE CODES

Figure 7C:
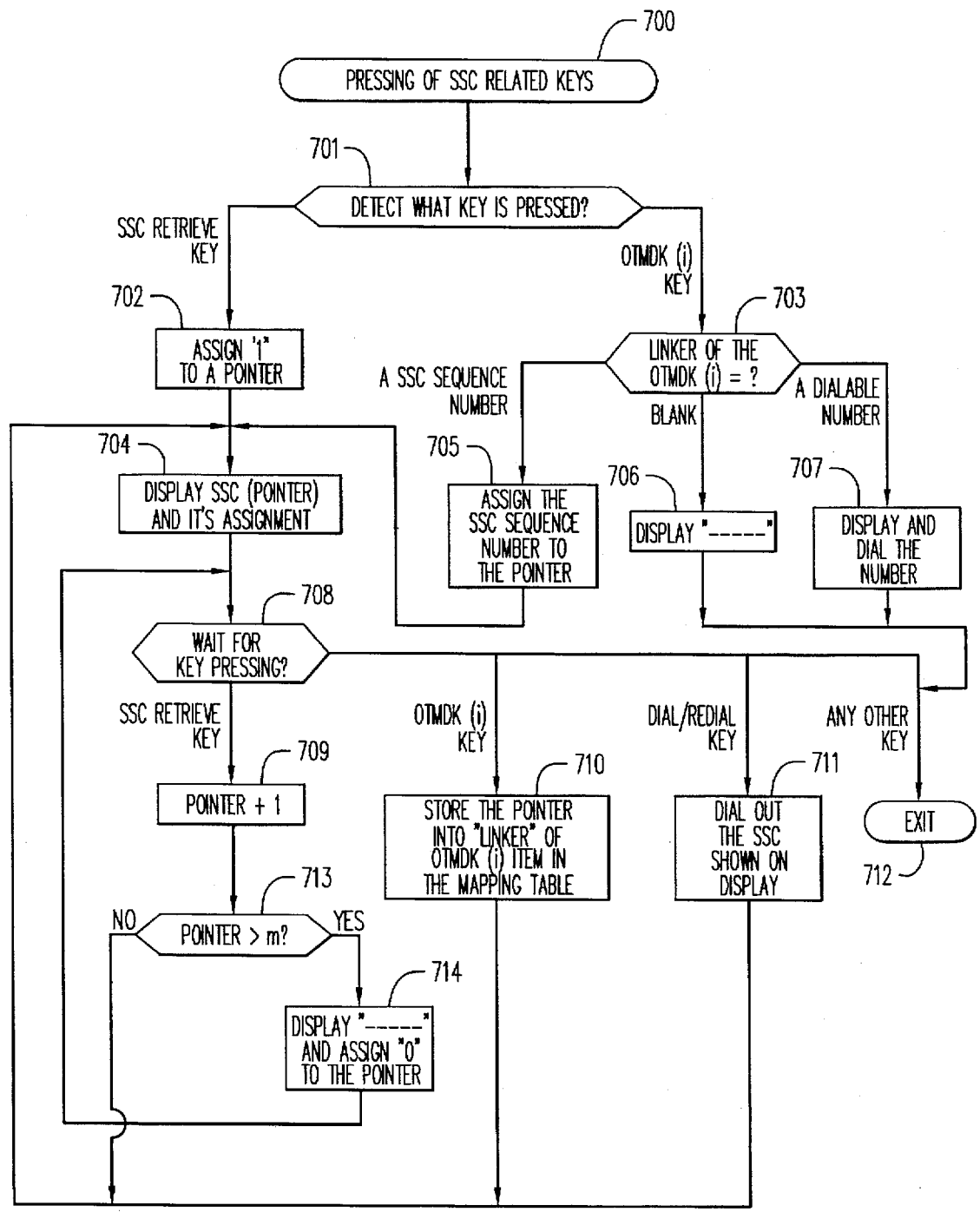
FIG. 7c is a flowchart of the proceedure for handling special service codes.

FIGS. 7a, 7b and 7c consists of two tables and a routine, respectively, which show the procedure for retrieving and displaying the special service code (SSC) bank, transferring a certain SSC and its assignment to a one touch memory dialing key (OTMDK), and dialing of the SSC. To do that, a SSC bank, a mapping table, a SSC retrieve key and several OTMDKs are provided. The SSC retrieve key and memory dialing keys are called SSC related keys. A bank of SSCs with their assignment is stored in the read only memory (ROM) of the feature phone. Until the user carries out certain operations, there is no relationship between OTMDKs and SSCs, ie all linkers in the mapping table are blank. Such relationships are established by related key operations carried out by the user. When a SSC related key is pressed at block 700, the system begins to test which key is being pressed at block 701. If it is the SSC retrieve key, the SSCs will be retrieved from the SSC bank. First, a pointer is given a value of 1 at block 702, and the first item of the SSC bank, including the SSC and its assignment, is fetched and displayed at step 704. At step 708, the system waits for the user's further instruction, that is further key pressing. If the user presses the SSC retrieve key again, the next item is accessed, so that the pointer is increased by 1 at block 709.

At this time, a check of whether or not the boundary of the SSC bank has been exceeded should be done at step 713. If not, the following item is fetched and displayed at block 704. Otherwise, a sign"-----" is displayed at block 714 to indicate that the boundary has been reached. Also in block 714, the pointer is given a value 0 to return to the beginning of the SSC bank.

If the i-th OTMDK is pressed at step 708, this indicates that the user wants to transfer the SSC shown on the display to the i-th OTMDK, so that a relationship between these two will be established. It is completed by storing the pointer, which is the sequence number of the SSC being displayed, into the linker of the i-th OTMDK in the MAPPING TABLE as shown in block 710. If the DIAL/REDIAL key is pressed at step 708, the SSC shown on the display is dialed out at block 711. If any other key, except those mentioned above, is pressed at step 707, the procedure of retrieving SSC bank, dialing selected SSC, or transferring SSC to certain OTMDK is terminated at block 712.

If instead of the SSC retrieve key at step 701, the i-th OTMDK is pressed, the system must first detect, at block 703, whether the i-th OTMDK has already had relationship with one SSC or whether an ordinary memory dialing number—dialable number has been stored into the key. If the linker of the OTMDK(i) is blank, it indicates that neither relationship nor dialable number exists and a sign"-----" is displayed at block 706. At this step, nothing more can be done before some relationship is established., and the processing is terminated at block 712. If a relationship between the OTMDK(i) and a SSC has already existed at block 703, the corresponding SSC is accessed and displayed together with its assignment at block 705 and 704. At this time, the user can dial the displayed SSC by the DIAL/REDIAL key. If a relationship between the OTMDK(i) or a dialable number has already existed at block 703, the displayed number will be dialed at block 707. After that, the routine is terminated at block 712.

Some services provided by phone companies, eg Call Forwarding-forward your calls from home to office or vice versa, may be needed only during certain hours. So when you want to start the service, just dial a Call Forwarding service code to the phone company. When you want to terminate the service, an associated terminating code should be dialed. In the case of some service codes, each has an associated code, and after certain hours of dialing of the service code, an associated code should be dialed.

Similar to the above described method in FIG. 7, the relationship between the service code and an associated code, eg terminating code, can be easily programmed and linked, and after the dialing of any one of the service codes, the relationship between the corresponding associated code and a common key can also be simply programmed. After dialing of a service code, if there is an associated code preprogrammed, just by pressing a common key the associated code will automatically be retrieved or dialed.

I claim:

1. A telephone or telephone add-on device which includes a recording system for recording information pertaining to outgoing telephone calls, said information including at least some of the date, time called, number and duration of the calls, a memory for storing the recorded information of a certain number of the outgoing telephone calls which is useful in assessing the cost of the telephone calls, a dynamic visual display for displaying the information, and further including toll call dialing lock means, wherein a plurality of unlock codes can be used to unlock the toll call dialing, and the assignment of an unlock code is also included in the contents of the record of each toll call, and each of the retrieved and shown records of a call also include the unlock code assignment.

2. A telephone or add-on device as claimed in claim 1, further including means for sorting records of toll calls into groups according to the unlock code assignment, wherein each group comprises calls with the same unlock code assignment.

3. A telephone or add-on device as claimed in claim 1, further including means for detecting signals and recording information pertaining to outgoing calls made on other telephones which are connected to the same telephone line.

4. A telephone or add on device as claimed in claim 1, further including detecting means for detecting the ringing back tone or off hook signal from the telephone of the called party.

5. A telephone or add on device as claimed in claim 1, further including means for eliminating/prohibiting a dialing pulse or tone signal to be sent out to the telephone line from the dialing of other telephone(s) connected to the same line when a toll call dialing is detected during lock mode.

6. A telephone or telephone add-on device which includes a recording system for recording information pertaining to outgoing telephone calls, said information including at least some of the date, time called, number and duration of the calls, a memory having two input terminals for storing the recorded information of a certain number of the outgoing telephone calls which is useful in assessing the cost of the telephone calls, a dynamic visual display for displaying the information, and a control system for optimizing the use of the memory so that information pertaining to more important calls is stored in preference to information pertaining to less important calls in the event of insufficient memory capacity by respectively storing data of two different types at said input terminals and deleting data pertaining to less important calls from an area of the memory intermediate said two terminals based on relative priority of said two types of data.

7. A telephone or add on device as claimed in claim 6, including means for timing the length of the outgoing calls comprising means for automatically starting the timing after a certain delay of the dialing of the last digit of the outgoing call number.

8. A telephone or add on device as claimed in claim 6, including means for timing the length of outgoing calls comprising a manual activity means for starting or restarting the time by pressing a timer key.

9. A telephone or add on device as claimed in claim 6, including means for timing the length of the outgoing calls comprising an automatic means for starting or restarting the timing by detecting the ringing back tone from the called party.

10. A telephone or add on device as claimed in claim 6, including means for timing the length of the outgoing calls comprising an automatic means for starting the timing by detecting the off hook signal of the telephone at the called party.

11. A telephone or add on device as claimed in claim 6, including local or toll call detecting means comprising means for detecting the prefix of the called number.

12. A telephone or add on device as claimed in claim 6, including local or toll call detecting means comprising means for detecting the number of digits in the called number.

13. A telephone or add on device as claimed in claim 6, including means for storing records of local calls into a local call memory if local calls are detected.

14. A telephone or add on device as claimed in claim 6, including means for storing records of toll calls into a toll call memory if toll calls are detected.

15. A telephone or add-on device as claimed in claim 6, further including toll call dialing lock means, wherein a plurality of unlock codes can be used to unlock the toll call dialing, and the unlock code assignment is also included in the contents of record of each toll call, and each of the retrieved and shown records of toll calls also includes the unlock code assignment.

16. A telephone or add-on device as claimed in claim 15, further including means for sorting records of toll calls into groups according to the unlock code assignment wherein each group comprises calls with the same unlock code assignment.

17. A telephone or add-on device as claimed in claim 15, further including means for detecting signals and recording information pertaining to outgoing calls made from other telephones which are connected to the same telephone line.

18. A telephone or add on device as claimed in claim 15, further including detecting means for detecting the ringing back tone or off hook signal from the telephone of the called party.

19. A telephone or telephone add on device as claimed in claim 1 for using a plurality of special service codes and the descriptions of codes, wherein all the codes can be retrieved by a common key and can be dialed by another common key, comprising: means for pre-programming a plurality of service codes and their descriptions; means for retrieving one of the pre-programmed service codes and its description by using a single key; means for displaying the service codes and their descriptions; and means for dialing the service code by using a common key while a code and its assignment are retrieved and displayed.

20. A telephone or add on device as claimed in claim 19, further comprising means for transferring a service code and its description to a one touch dialing key.

21. A telephone or telephone add on device as claimed in claim 1 including a plurality of special service codes wherein means are provided for retrieving or dialing a code associated to a previously dialled code, and a common key can be used to retrieve or dial any one of the associated codes after dialing of the previous dialing code.

22. A telephone or telephone add on device for using a plurality of special service codes and the descriptions of the codes, wherein all the special service codes can be retrieved by a common key and be dialed by another common key, comprising: means for pre-programming a plurality of service codes and their descriptions; means for retrieving one of the pre-programmed service codes and its description by using a single key; means for displaying the service codes and their descriptions; and means for dialing the service code by using a common key while a code and its assignment are retrieved.

23. A telephone or add on device as claimed in claim 22, further comprising means for transferring a service code and its description to a one touch memory dialing key.

24. A telephone or telephone add-on device as claimed in claim 22 including a plurality of special service codes wherein means are provided for retrieving or dialing a code associated with a previously dialed code, and a common key can be used to retrieve or dial any one of the associated codes after dialing of the previously dialed code.

* * * * *